(12) United States Patent
Cho et al.

(10) Patent No.: US 7,939,216 B2
(45) Date of Patent: May 10, 2011

(54) POLYMER ELECTROLYTE MEMBRANE, METHOD OF PREPARING THE SAME AND FUEL CELL EMPLOYING THE SAME

(75) Inventors: Chung-kun Cho, Yongin-si (KR); Doo-yeon Lee, Yongin-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 1157 days.

(21) Appl. No.: 11/650,958

(22) Filed: Jan. 9, 2007

(65) Prior Publication Data
US 2007/0166592 A1 Jul. 19, 2007

(30) Foreign Application Priority Data

Jan. 13, 2006 (KR) .................. 10-2006-0003941

(51) Int. Cl.
*H01M 8/10* (2006.01)
(52) U.S. Cl. ........ 429/491; 429/493; 429/479; 429/408; 429/409; 429/314; 429/317; 252/62.2; 521/27
(58) Field of Classification Search .................. 429/491, 429/493, 479, 408, 409, 314, 317; 252/62.2; 521/27
See application file for complete search history.

(56) References Cited

U.S. PATENT DOCUMENTS

| 5,525,436 A | 6/1996 | Savinell et al. |
| 7,678,860 B2 * | 3/2010 | Muramoto et al. ......... 252/62.2 |

FOREIGN PATENT DOCUMENTS

| JP | 2003-335835 | * 11/2003 |
| JP | 2004-263153 | 9/2004 |
| WO | WO 2004/078822 A1 | 9/2004 |
| WO | WO 2005-027144 | * 3/2005 |

OTHER PUBLICATIONS

English Abstract for Japanese Patent No. 2004-263153.
Office Action issued in Korean Patent Application No. 2006-3941 issued on Nov. 20, 2006.

\* cited by examiner

*Primary Examiner* — Laura S Weiner
(74) *Attorney, Agent, or Firm* — Lee & Morse, P.C.

(57) ABSTRACT

A polymer electrolyte membrane includes a cross-linking reaction product between a hydrophilic polymer and a cross-linking agent represented by Formula 1 below

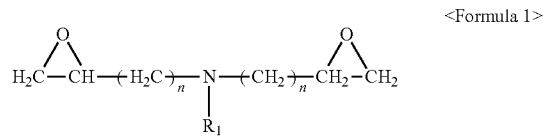

<Formula 1> wherein R1 is substituted or unsubstituted C1-C20 alkyl group, substituted or unsubstituted C6-C20 aryl group, or substituted or unsubstituted C2-C20 heteroaryl group; and n is an integer in the range of 1 to 5. The polymer electrolyte membrane may be prepared by preparing a composition for forming a polymer electrolyte membrane including the hydrophilic polymer, the cross-linking agent represented by Formula 1 and a solvent, applying the composition for forming a polymer electrolyte membrane to a supporting substrate; and heat treating the composition for forming the polymer electrolyte membrane to form the polymer electrolyte membrane. A fuel cell or other device includes the polymer electrolyte membrane. The polymer electrolyte membrane has low solubility to a strong acid and excellent ionic conductivity. Also, the polymer electrolyte membrane is suitable for high temperatures and has excellent durability obtained by reinforcing the mechanical strength of the electrolyte membrane. By employing such a polymer electrolyte membrane, a fuel cell having excellent efficiency, etc. can be prepared.

20 Claims, 2 Drawing Sheets

POLYMER ELECTROLYTE MEMBRANE, METHOD OF PREPARING THE SAME AND FUEL CELL EMPLOYING THE SAME

CROSS-REFERENCE TO RELATED APPLICATIONS

This application claims the benefit of Korean Application No, 10-2006-03941, filed on Jan. 13, 2006, in the Korean Intellectual Property Office, the disclosure of which is incorporated herein by reference.

BACKGROUND OF THE INVENTION

1. Field of the Invention

Aspects of the present invention relate to a polymer electrolyte membrane, a method of preparing the same and a fuel cell employing the same, and more particularly, to a polymer electrolyte membrane having excellent ionic conductivity and durability, a method of preparing the same and a fuel cell employing the same.

2. Description of the Related Art

Fuel cells can be classified into polymer electrolyte membrane fuel cells (PEMFCs), phosphoric acid fuel cells (PAFCs), molten carbonate fuel cells (MCFCs), solid oxide fuel cells (SOFCs), and other kinds depending on the type of electrolyte used. The working temperature of fuel cells and their constituent materials vary depending on the type of electrolyte used.

A PEMFC is small and lightweight, but can achieve a high output density. Furthermore, a power generation system can be easily constituted using PEMFCs.

A basic PEMFC may include an anode (fuel electrode), a cathode (oxidizing agent electrode), and a polymer electrolyte membrane interposed between the anode and the cathode. The anode may include a catalyst layer to promote the oxidation of a fuel. The cathode may include a catalyst layer to promote the reduction of an oxidizing agent.

The fuel supplied to the anode may generally be hydrogen, a hydrogen-containing gas, a mixture of methanol vapor and water vapor, an aqueous methanol solution, etc. The oxidizing agent supplied to the cathode may generally be oxygen, an oxygen-containing gas, or air.

Fuel is oxidized to produce protons and electrons at the anode of the PEMFC. The protons migrate to the cathode through the electrolyte membrane and the electrons migrate to an external circuit (load) through a conductive wire (or current collector). The electrons are supplied to the cathode from the external circuit through another conductive wire (or current collector). At the cathode of the PEMFC, the migrated protons react with the electrons and oxygen to produce water. The migration of electrons from the anode to the cathode via the external circuit is the result of electric power.

In a PEMFC, the polymer electrolyte membrane acts as an ionic conductor for the migration of protons from the anode to the cathode and also acts as a separator to prevent contact between the anode and the cathode. The polymer electrolyte membrane therefore requires sufficient ionic conductivity, must provide electrochemical safety, have high mechanical strength, and have thermal stability at its operating temperature, and should be easily formed into thin layers.

Generally, materials for the polymer electrolyte membrane include a sulfonated perfluorinated polymer with fluorinated alkylene in the backbone and fluorinated vinylether side chains with sulfonic acid at its terminal, such as NAFION®, manufactured by DUPONT. The polymer electrolyte membrane absorbs an appropriate amount of water and provides excellent ionic conductivity.

However, such a polymer electrolyte membrane may not provide satisfactory methanol permeability and is typically expensive to produce. Also, the polymer electrolyte membrane may experience a lower ionic conductivity at operating temperatures of 100° C. or higher due to the loss of moisture by evaporation. It may therefore be difficult to operate a PEMFC using this type of polymer electrolyte membrane under atmospheric pressure at a temperature of about 100° C. or higher. Therefore, the use of polymer electrolyte membranes that include NAFION® may be limited to PEMFCs that can operate at 100° C. or lower, such as, for example, PEMFCs that operate at about 80° C.

A fuel cell operating at a temperature of 100° C. or higher can have less of a problem of catalyst poisoning by CO compared to a fuel cell operating at a low temperature. Also, a higher operating temperature of a fuel cell increases the activity of fuel cell catalysts, enabling a higher output. On the other hand, the durability of a polymer electrolyte membrane may be lessened at high temperatures, and the ionic conductivity may deteriorate due to dryness.

When NAFION® is used as a polymer electrolyte membrane to be operated at a high temperature of 100° C. or more, the ability of the NAFION® to contain water may deteriorate. Hence, forming the polymer electrolyte membrane by adding a heteropoly acid or using an inorganic material such as silica, etc. has been carried out. When adding a heteropoly acid, the operating temperature of a fuel cell may be increased a little bit, but heteropoly acids typically dissolve in water. Also, if the above forming method of the polymer electrolyte membrane is used, the ionic conductivity of the polymer electrolyte membrane is low because the polymer electrolyte membrane does not have a good ability to contain water at 130° C. or higher.

U.S. Pat. No. 5,525,436 describes a solution to the problem of dryness of a polymer electrolyte membrane carried out by impregnating a strong acid such as phosphoric acid, sulfuric acid, etc., into polybenzimidazole. As the amount of impregnated phosphoric acid in an electrolyte membrane increases, the ion conductivity increases. However, the mechanical strength of the electrolyte membrane deteriorates.

When a strong acid such as phosphoric acid, sulfuric acid, or the like is impregnated into a polymer, a hydrophilic polymer containing a hydroxyl group, an amino group, or an acid group may be used as the polymer. The hydrophilic polymer may form a hydrogen bond with the strong acid or form a strong bond by forming a complex with the strong acid to improve the strong acid retention capacity.

However, such a hydrophilic polymer easily dissolves in a strong acid, and thus the use of the hydrophilic polymer is limited. Also, hydrophilic polymer typically swell easily, and thus do not provide sufficient mechanical strength.

SUMMARY OF THE INVENTION

Aspects of the present invention provide a polymer electrolyte membrane having low solubility to a strong acid, high mechanical strength, and excellent ionic conductivity and durability, and a method of preparing the same.

Aspects of the present invention also provide a fuel cell having excellent efficiency, etc., by employing the polymer electrolyte membrane.

According to an aspect of the present invention, there is provided a polymer electrolyte membrane including a cross-linking reaction product between a hydrophilic polymer and a cross-linking agent represented by Formula 1 below:

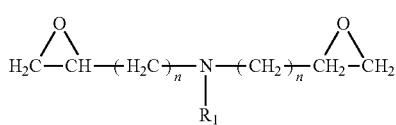
<Formula 1> wherein $R_1$ is a substituted or unsubstituted C1-C20 alkyl group, a substituted or unsubstituted C6-C20 aryl group, or a substituted or unsubstituted C2-C20 heteroaryl group; and n is an integer in the range of 1 to 5.

For example, $R_1$ may be a substituted C6-20 aryl group substituted with —N(R)(R') (where R and R' are independently hydrogen, a C1-C10 alkyl group or a glycidyl group), an epoxy group, a hydroxyl group, a phosphoric acid group, a sulfonic acid group, or an imidazole group. As another example, $R_1$ may be a substituted C2-C20 heteroaryl group substituted with —N(R)(R') (where R and R' are independently hydrogen, a C1-C10 alkyl group or a glycidyl group), an epoxy group, an alkylamino group containing an epoxy group, a hydroxyl group, a phosphoric acid group, a sulfonic acid group, or an imidazole group.

According to another aspect of the present invention, there is provided a method of preparing a polymer electrolyte membrane including: preparing a composition for forming the polymer electrolyte membrane by mixing a hydrophilic polymer, a cross-linking agent represented by Formula 1 below and a solvent,

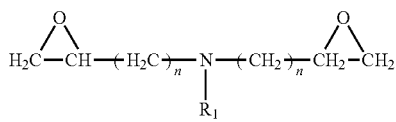
<Formula 1> wherein $R_1$ is a substituted or unsubstituted C1-C20 alkyl group, a substituted or unsubstituted C6-C20 aryl group, or a substituted or unsubstituted C2-C20 heteroaryl group; and n is an integer in the range of 1 to 5; applying the composition for forming the polymer electrolyte membrane to a supporting substrate; and heat treating the composition for forming the polymer electrolyte membrane to form the polymer electrolyte membrane.

According to another aspect of the present invention, there is provided a fuel cell including the polymer electrolyte membrane described above.

According to another aspect of the present invention, there is provided a device comprising an anode, a cathode, and the polymer electrolyte membrane described above interposed between the anode and the cathode.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
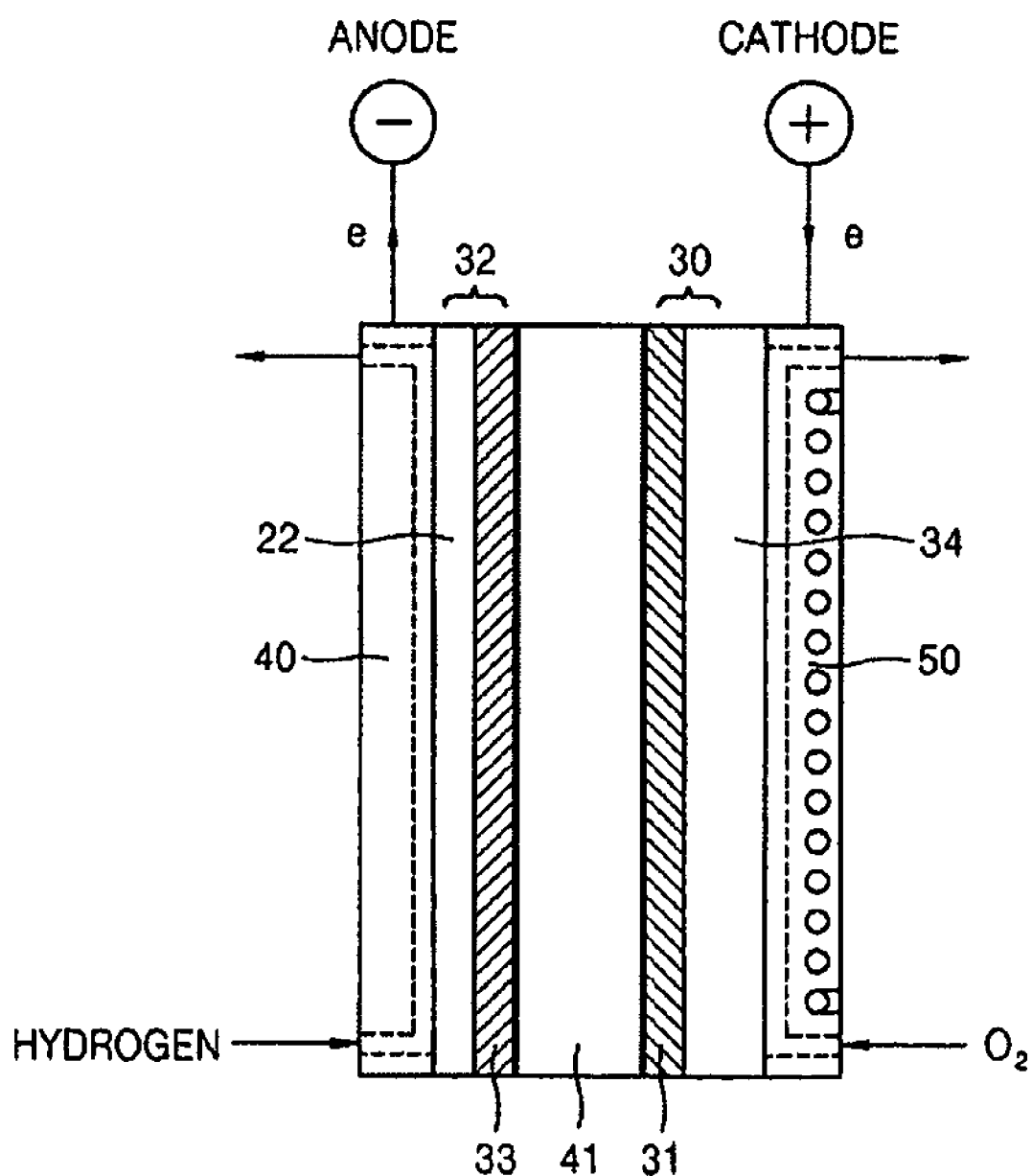
FIG. 1 is a schematic diagram of a fuel cell according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

A polymer electrolyte membrane according to an embodiment of the present invention includes a cross-linking reaction product between a hydrophilic polymer and a cross-linking agent represented by Formula 1 below, and optionally includes an acid:

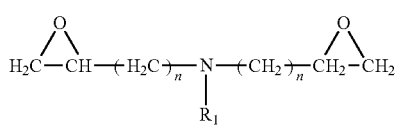
<Formula 1> wherein $R_1$ is a substituted or unsubstituted C1-C20 alkyl group, a substituted or unsubstituted C6-C20 aryl group, or a substituted or unsubstituted C2-C20 heteroaryl group; and n is an integer in the range of 1 to 5. (In other words, n can be 1, 2, 3, 4 or 5.)

As non-limiting examples, the substituted C6-20 aryl group may be substituted with —N(R)(R') (where R and R' are independently hydrogen, a C1-C10 alkyl group or a glycidyl group), an epoxy group, a hydroxyl group, a phosphoric acid group, a sulfonic acid group, or an imidazole group; and the substituted C2-C20 heteroaryl group may be substituted with —N(R)(R') (where R and R' are independently hydrogen, a C1-C10 alkyl group or a glycidyl group), an epoxy group, an alkylamino group containing an epoxy group, a hydroxyl group, a phosphoric acid group, a sulfonic acid group, or an imidazole group.

As a non-limiting example, n of Formula 1 may be in the range of 1 to 3. As a specific, non-limiting example, n may be 1.

The hydrophilic polymer has an excellent ability to contain an acid such as a phosphoric acid in PEMFC at a high temperature. The hydrophilic polymer may be a polymer such as poly (vinyl alcohol), poly (ethyleneimine), poly (acrylamide), polybenzimidazole, or polyimidazole; or a sulfonated polymer such as sulfonated polyaryletherketone, sulfonated polyphenyleneoxide, sulfonated polyether sulfone, or sulfonated polyetherimide.

A polymer such as poly (vinyl alcohol), poly (vinylpyridine), poly (ethyleneimine), or the like has an excellent ability to contain acid, but can easily dissolve in the acid. Also, in the case of a sulfonated polymer, as the amount of the sulfone group increases, the ability of the polymer to contain acid increases, but the mechanical strength decreases.

However, if the hydrophilic polymer is crosslinked to form a three dimensional network structure, the hydrophilic polymer does not dissolve in water or acid, and has strong mechanical strength.

The cross-linking agent represented by Formula 1 below is strong against acids and heat. Also, the cross-linking agent may form a complex with an acid to improve the phosphoric acid retention capacity of the hydrophilic polymer through a strong interaction,

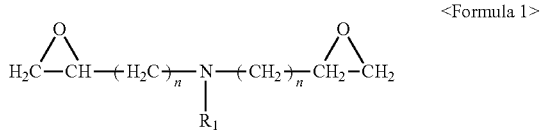

<Formula 1> wherein R1 is a substituted or unsubstituted C1-C20 alkyl group, a substituted or unsubstituted C6-C20 aryl group, or a substituted or unsubstituted C2-C20 heteroaryl group; and n is an integer in the range of 1 to 5.

The term "C6-C20 aryl group" refers generally to a carbocyclic aromatic system including at least one ring, wherein if more than one ring is present, the rings are fused or pendantly attached. For example, the term "aryl" includes aromatic systems such as phenyl, naphthyl, and tetrahydronaphthyl. Also, at least one hydrogen atom from the aryl group may be substituted with a substituent such as a halogen atom, a C1-C30 alkyl group, a C1-C30 alkoxy group, a C1-C8 alkylamino group, a hydroxyl group, a nitro group, a cyano group, an amino group, an amidino group, a hydrazine, a hydrazone, a carboxyl group, a sulfonic acid group, a phosphoric acid group, etc.

The term "C2-C20 heteroaryl group" refers generally to a C2-C20 ring compound having one, two, or three hetero atoms selected from the group consisting of N, O, P, and S. If more than one ring is present, the rings may be fused or pendantly attached. Examples of the heteroaryl group include pyridyl, thienyl, furyl, etc.

In Formula 1, the substituted C6-C20 aryl group and the substituted C2-C20 heteroaryl group may be substituted with —N(R)(R') (wherein R and R' are independently hydrogen, a C1-C10 alkyl group or a glycidyl group), an epoxy group, a hydroxyl group, a phosphate group, a sulfonic acid group, or an imidazole group. When a substituent such as an amino group, an epoxy group, a hydroxyl group, a phosphoric acid group, a sulfonic acid group or an imidazole group is used in the cross-linking agent, the phosphoric acid retention capacity of the hydrophilic polymer is improved.

Examples of R1 include the following groups.

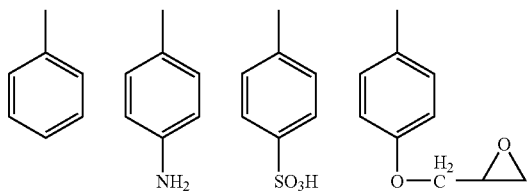

As specific, non-limiting examples, the cross-linking agent of Formula 1 may be a chemical compound represented by Formula 2 or 3 below.

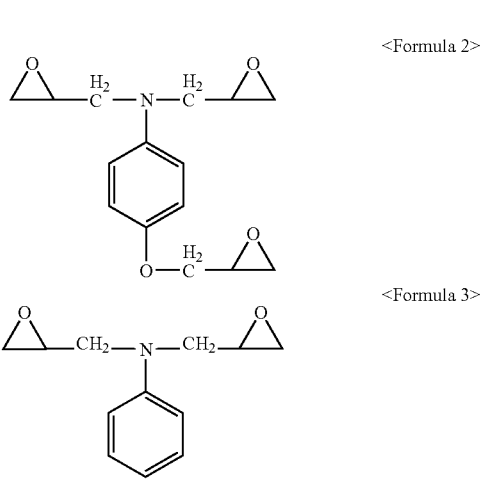

A method of preparing a polymer electrolyte membrane according to an embodiment of the present invention will now be described.

First, a hydrophilic polymer, a cross-linking agent of Formula 1 and a solvent are mixed to form a composition for forming a polymer electrolyte membrane. The composition for forming a polymer electrolyte membrane may further include an acid if desired. If an acid is added at this time, an acid impregnation process after forming the polymer electrolyte membrane may be skipped.

The amount of the cross-linking agent of Formula 1 may be in the range of 0.01 to 0.5 mol based on 1 mol of the hydrophilic polymer repeating unit. When the amount of the cross-linking agent is less than 0.01 mol, the degree of cross linkage may be insignificant, resulting in low mechanical strength of the polymer electrolyte membrane and poor resistance to dissolution in an acid or water. When the amount of the cross-linking agent is greater than 0.5 mol, the acid or water retention capacity may not be sufficient.

The solvent may be dimethylacetamide, dimethylformamide, dimethylsulfoxide, N-methyl-2-pyrrolidone, or the like. The amount of the solvent may be in the range of 100 to 2,000 parts by weight based on 100 parts by weight of the hydrophilic polymer. When the amount of the solvent is less than 100 parts by weight, the viscosity of the solvent may be too high. When the amount of the solvent is greater than 2,000 parts by weight, the viscosity of the solvent may be too low to obtain a membrane having a uniform shape.

The acid may include at least one acid selected from the group consisting of sulfuric acid, phosphoric acid, methanesulfonic acid, and trifluoromethane sulfonic acid. The amount of the acid may be in the range of 100 to 500 parts by weight based on 100 parts by weight of the hydrophilic polymer. When the amount of the acid is less than 100 parts by weight, the ionic conductivity of the polymer electrolyte membrane may be too low. When the amount of the acid is greater than 500 parts by weight, the mechanical strength may be too low and the polymer electrolyte membrane may break easily.

The composition for forming a polymer electrolyte membrane is applied to a supporting substrate such as, for example, a polyethylene terephthalate membrane, and the product is heat-treated for a sufficient amount of time to convert the composition for forming the polymer electrolyte membrane into the polymer electrolyte membrane. For example, the heating time may be in the range of 1 minute to 10 hours and the heat treating temperature may be in the range of 60 to 130° C.

The heat treatment may include first and second heat treatments performed in sequence.

The first heat treatment may be primarily a drying process. The first heat treatment may be sufficient for some cross-linking to occur; however, for additional cross-linking, the second heat treatment may need to be performed. For example, the first heat treatment step may provide sufficient drying and cross-linking so that the resultant product can be removed from the supporting substrate, and then the second heat treatment step can be carried out on the detached resultant product to provide further cross-linking. Alternatively, both heat treatments may be carried out while the composition for forming the polymer electrolyte membrane is on the supporting substrate and then the formed polymer electrolyte membrane may be removed from the supporting substrate.

The temperature of the first heat treatment may be in the range of 60 to 100° C. and the temperature of the second heat treatment may be in the range of 100 to 130° C. for the cross-linking reaction. When the temperatures of the first and second heat treatment are less than 60° C., the product may not dry sufficiently, and the cross-linking reaction may not occur. When the temperatures of the first and second heat treatment are greater than 130° C., a clean membrane may be obtained because the supporting substrate may be transformed, or the membrane may not detach easily from the supporting substrate.

An example of cross-linking of a hydrophilic polymer and the cross-linking agent of Formula 1 according to an embodiment of the present invention is shown below.

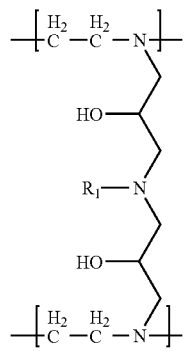

The cross-linking reaction can be performed rapidly by using a catalyst. The catalyst may be, for example, an amine-based compound, such as a tributylamine, an organophosphorus compound, such as a triphenylphosphine, or an imidazole-based compound, such as 2-methylimidazole. The amount of the catalyst may be in the range of 0.001 to 0.01 mol based on 1 mol of the hydrophilic polymer repeating unit.

The electrolyte membrane obtained through the above process is detached from the supporting substrate to obtain the polymer electrolyte membrane according to an embodiment of the present invention. The thickness of the polymer electrolyte membrane may typically be in the range of 10 to 100 µm.

The polymer electrolyte membrane can be used as an electrolyte membrane of a fuel cell. Also, the polymer electrolyte membrane can be used as an electrolyte membrane of any type of device that has an anode and a cathode separated by an electrolyte membrane, such as, for example, a display device, an electrochromic device, or a sensor.

A fuel cell according to an embodiment of the present invention includes a cathode, an anode and a polymer electrolyte membrane interposed between the cathode and the anode.

The cathode and the anode may each include a gas diffusion layer and a catalyst layer. The catalyst layer includes a metal catalyst which catalytically helps related reactions (oxidation of hydrogen and reduction of oxygen). The catalyst layer may include at least one catalyst selected from the group consisting of platinum, ruthenium, osmium, a platinum-osmium alloy, a platinum-palladium alloy and a platinum-M alloy, wherein M is at least one transition metal selected from the group consisting of Ga, Ti, V, Cr, Mn, Fe, Co, Ni, Cu, or Zn. Preferably, the catalyst layer includes platinum, ruthenium, osmium, a platinum-ruthenium alloy, a platinum-osmium alloy, a platinum-palladium alloy, a platinum-cobalt alloy, and a platinum-nickel alloy.

Also, a metal catalyst supported by a carrier can be used as the metal catalyst. The carrier may be carbon such as acetylene black or graphite or an inorganic particle such as alumina, silica, etc. A noble metal contained in a carrier may be used as the catalyst. Such a catalyst may be commercially available in the market or the catalyst may be prepared by injecting a noble metal into a carrier.

The gas diffusion layer may be a carbon paper or a carbon cloth, but is not limited thereto. The gas diffusion layer supports an electrode for the fuel cell and diffuses a reaction gas towards the catalyst layer so that the reaction gas can easily approach the catalyst layer. Also, the carbon paper or the carbon cloth may be coated with a fluorine-based resin such as polytetrafluoroethylene to be water repellent. Such a gas diffusion layer prevents interference with gas diffusion that can be caused by water generated during operation of the fuel cell.

The electrode may further include a microporous layer to increase the gas diffusion between the gas diffusion layer and the catalyst layer. The microporous layer may be formed of a compound containing a conductive material, such as carbon powder, carbon black, activated carbon, acetylene black, or the like, a binder such as polytetrafluoroethylene, and an ionomer if required.

A method of preparing the fuel cell employing the polymer electrolyte membrane according to an embodiment of the present invention will be described with reference to FIG. 1.

A fuel cell according to an embodiment of the present invention has the structure shown in FIG. 1.

Referring to FIG. 1, the fuel cell includes an anode 32, a cathode 30, and an electrolyte membrane 41 interposed between the anode 32 and the cathode 30. The anode 32 is formed of an anode diffusion layer 22 and an anode catalyst layer 33, and the cathode 30 is formed of a cathode diffusion layer 34 and a cathode catalyst layer 31.

Fuel transferred to the anode catalyst layer 33 through the anode diffusion layer 22 is decomposed into electrons, hydrogen ions, etc. The hydrogen ions are transferred to the cathode catalyst layer 31 through the electrolyte membrane 41, and the electrons are transferred to an external circuit. In the cathode catalyst layer 31, the hydrogen ions transferred from the electrolyte membrane 41, the electrons supplied from the external circuit, and oxygen transferred from the cathode diffusion layer 34 react to form water.

Aspects of the present invention will now be described in further detail with reference to the following examples. These examples are for illustrative purposes only, and are not intended to limit the scope of the present invention.

EXAMPLE 1

Preparing a Polymer Electrolyte Membrane

Polybenzimidazole was dissolved in demethylacetamide to obtain a 10 wt % PBI solution. N,N-diglycidylaniline was added to the PBI solution at a weight ratio of 0.5:100, and the mixture was stirred at room temperature. The mixture was coated onto a supporting substrate, heat treated at 80° C. for two hours, and then the resultant was detached from the supporting substrate and heated again at 130° C. for another two hours to obtain a polymer electrolyte membrane.

EXAMPLE 2

Preparing a Polymer Electrolyte Membrane

A polymer electrolyte membrane was obtained in the same manner as in Example 1, except that N,N-diglycidylaniline was added to the PBI solution at a weight ratio of 1:100.

EXAMPLE 3

Preparing a Polymer Electrolyte Membrane

A polymer electrolyte membrane was obtained in the same manner as in Example 1, except that N,N-diglycidylaniline was added to the PBI solution at a weight ratio of 1.5:100.

EXAMPLE 4

Preparing a Polymer Electrolyte Membrane

A polymer electrolyte membrane was obtained in the same manner as in Example 1, except that N,N-diglycidylaniline was added to the PBI solution at a weight ratio of 2:100.

COMPARATIVE EXAMPLE 1

Preparing a Polymer Electrolyte Membrane

A polymer electrolyte membrane was obtained in the same manner as in Example 1, except that N,N-diglycidylaniline was not used.

To examine whether the polymer electrolyte membranes obtained from Examples 1 through 4 and Comparative Example 1 dissolve in phosphoric acid, a hot phosphoric acid resistance evaluation was performed. 0.015 g of each of the polymer electrolyte membranes was added in 20 g of an 85 wt % phosphoric acid, and the mixture was put into a convection oven at 150° C. A container containing the mixture was not capped so that water in the phosphoric acid could evaporate. Dissolution of the polymer electrolyte membrane was examined with the naked eye. In Comparative Example 1 in which the cross-linking agent was not added, the polymer electrolyte membrane completely dissolved in the phosphoric acid in 2 hours and 30 minutes. However, in Examples 1 through 4 in which the cross-linking agent was added, the polymer electrolyte membrane did not dissolve in the phosphoric acid for at least 24 hours.

COMPARATIVE EXAMPLE 2

Preparing a Polymer Electrolyte Membrane

A polymer electrolyte membrane was obtained in the same manner as in Example 1, except that ethyleneglycol diglycidylether was added to the PBI solution at a weight ratio of 0.56:100 instead of N,N-diglycidylaniline.

The polymer electrolyte membrane obtained from Comparative Example 2 had cracks within 3 hours, and broke into pieces.

EXAMPLE 5

Preparing a Polymer Electrolyte Membrane

Polybenzimidazole was dissolved in demethylacetamide to obtain a 10 wt % PBI solution. 0.5 g of N,N-diglycidylaniline was added to the PBI solution at a weight ratio of 0.5:100, and the mixture was stirred at room temperature. The mixture was coated onto a supporting substrate, heat treated at 80° C. for two hours, and then the resultant was detached from the supporting substrate, and heated again at 130° C. for another two hours to obtain a polymer electrolyte membrane. The polymer electrolyte membrane was impregnated with 85% phosphoric acid at 80° C. and then was cut into a specimen having a dog bone shape with a length of 6.35 cm and a width of 3 mm.

Using a universal tensile testing machine, a graph of stress against strain was obtained. The test speed was 20 mm/min.

COMPARATIVE EXAMPLE 3

Preparing a Polymer Electrolyte Membrane

A polymer electrolyte membrane was obtained in the same manner as in Example 5, except that N,N-diglycidylaniline was not used.

Figure 2:
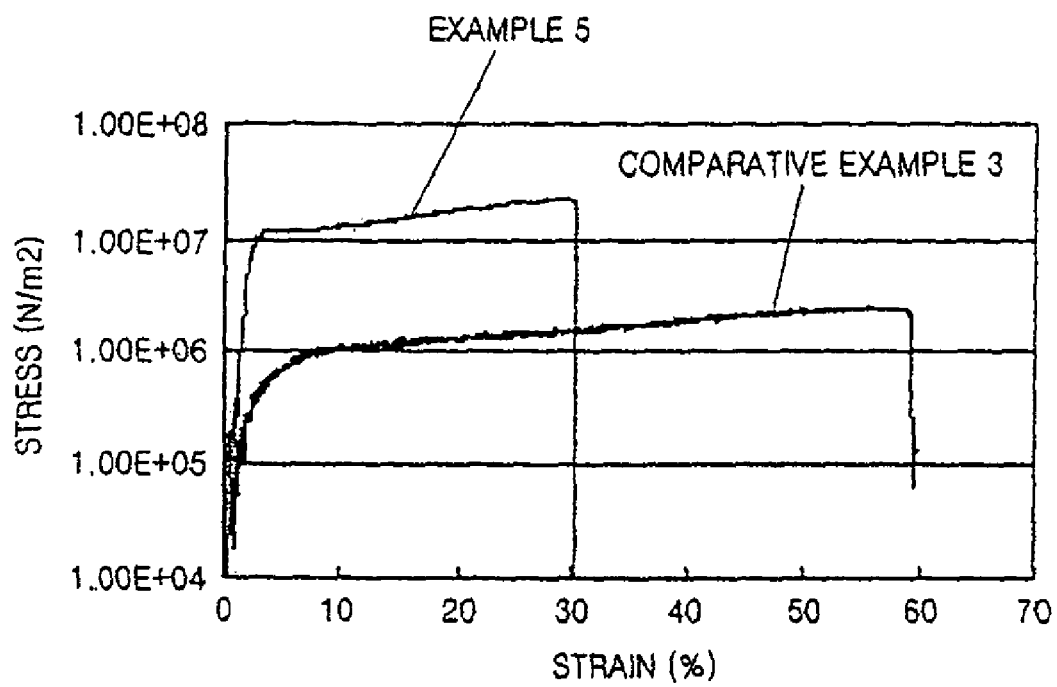
FIG. 2 is a graph of stress against strain of polymer electrolyte membranes of Example 5 and Comparative Example 3.

The graph of strain against stress of the polymer electrolyte membranes of Example 5 and Comparative Example 3 is represented in FIG. 2.

Referring to FIG. 2, the polymer electrolyte membrane of Example 5 had greater mechanical strength than the polymer electrolyte membrane of Comparative Example 3.

EXAMPLE 6

Preparing a Fuel Cell 7 g of Pt/C, 7 g of N-methyl-pyrrolidone (NMP), 3.5 g of PBI/NMP (10 wt % solution), and 3.5 g of PVdF/NMP (5 wt % solution) (PVdF=polyvinylidene fluoride) were injected into a mortar and mixed for 10 minutes to prepare a slurry for an electrode. The slurry for an electrode was coated onto a 22.0 cm×7.0 cm gas diffusion layer using a doctor-blade. The product was dried at room temperature for one hour, then at 80° C. for another hour, and then 120° C. for 30 minutes. Finally, the product was dried again in a vacuum oven at 150° C. for ten minutes.

An electrode for testing was prepared by cutting the final product into 3.1 cm×3.1 cm square. The density of Pt in the electrodes was 1.23 mg/cm$^2$ for the anode and 1.34 mg/cm$^2$ for the cathode. The electrode was doped with 85 wt % phosphoric acid and then dried at 80° C. for one hour. The amount of phosphoric acid doped was 1.2 mg/cm$^2$ for the anode and 1.3 mg/cm$^2$ for the cathode.

Polybenzimidazole was dissolved in dimethylacetamide to obtain a 10 wt % PBI solution. 0.7 g of N,N-diglycidylaniline was added to the PBI solution at a weight ratio of 0.7:100, and the mixture was stirred at room temperature. The mixture was coated onto a supporting substrate, heat treated at 80° C. for two hours and again at 130° C. for another two hours, and then the resultant was detached from the supporting substrate to obtain a polymer electrolyte membrane. The polymer electrolyte membrane was impregnated with 85% phosphoric acid at 80° C. for 30 minutes. After impregnation, the polymer electrolyte membrane was disposed between the electrodes and then pressed to prepare a membrane electrode assembly. Unit cell properties were evaluated using the membrane electrode assembly. The operating temperature of the fuel cell was 150° C. and the flow rates of hydrogen and air were 100 ml/min and 200 ml/min, respectively.

COMPARATIVE EXAMPLE 4

Preparing a Fuel Cell

A fuel cell was prepared in the same manner as in Example 6, except that the polymer electrolyte membrane obtained from Comparative Example 3 was used.

Figure 3:
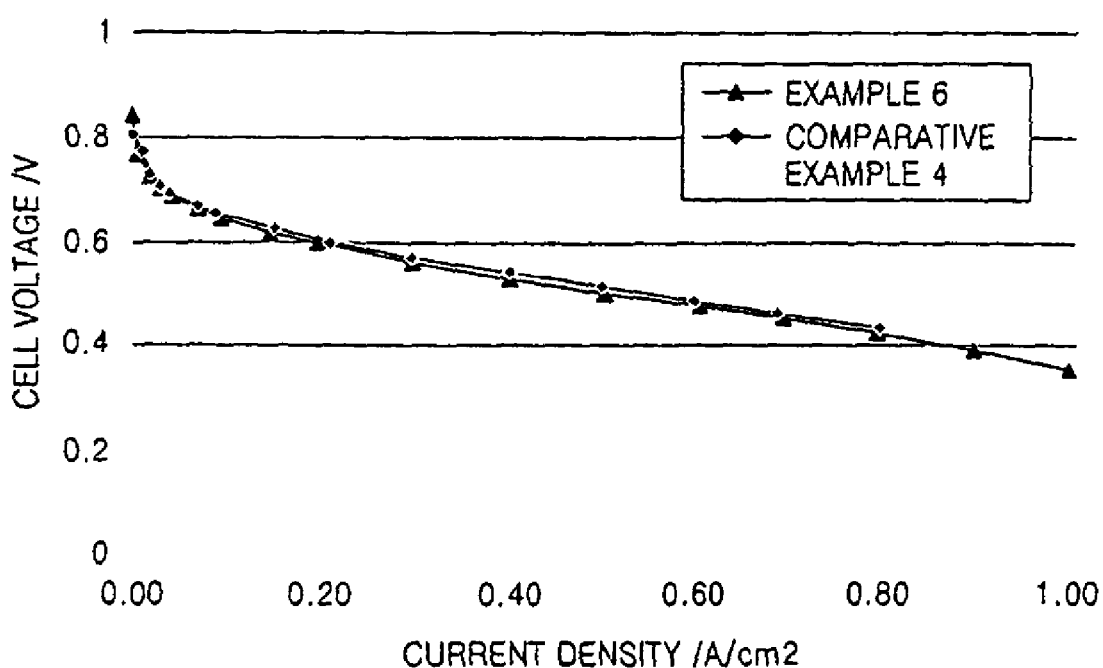
FIG. 3 is a graph of current density against cell voltage of fuel cells prepared according to Example 6 and Comparative Example 4.

Cell voltage against current density of the fuel cells obtained in Example 6 and Comparative Example 4 are shown in FIG. 3.

Referring to FIG. 3, the fuel cell of Example 6 had a similar cell performance to the fuel cell of Comparative Example 4.

The polymer electrolyte membrane according to aspects of the present invention has low solubility in a strong acid and excellent ionic conductivity. Also, the polymer electrolyte membrane can be used at high temperatures and has excellent durability, which is obtained by reinforcing the mechanical strength of the electrolyte membrane. By employing such a polymer electrolyte membrane, a fuel cell having excellent efficiency, etc., can be prepared.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A polymer electrolyte membrane for fuel cell comprising a cross-linking reaction product between a hydrophilic polymer and a cross-linking agent represented by Formula 1 below, wherein the hydrophilic polymer comprises at least one material selected from the group consisting of poly (vinyl alcohol), poly (acrylamide), sulfonated polyaryletherketone, sulfonated polyphenyleneoxide, sulfonated polyether sulfone, sulfonated polyetherimide, polybenzimidazole, and polyimidazole, and the amount of the cross-linking agent is in the range of 0.01 to 0.5 mol based on 1 mol of the hydrophilic polymer repeating unit,

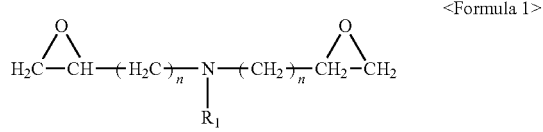

<Formula 1> wherein $R_1$ is a substituted or unsubstituted C1-C20 alkyl group, a substituted or unsubstituted C6-C20 aryl group, or a substituted or unsubstituted C2-C20 heteroaryl group; and n is an integer in the range of 1 to 5.

2. The polymer electrolyte membrane of claim 1, wherein $R_1$ is a substituted C6-20 aryl group substituted with —N(R)(R') (where R and R' are independently hydrogen, a C1-C10 alkyl group or a glycidyl group), an epoxy group, a hydroxyl group, a phosphoric acid group, a sulfonic acid group, or an imidazole group.

3. The polymer electrolyte membrane of claim 1, wherein $R_1$ is a substituted C2-C20 heteroaryl group substituted with —N(R)(R') (where R and R' are independently hydrogen, a C1-C10 alkyl group or a glycidyl group), an epoxy group, an alkylamino group containing an epoxy group, a hydroxyl group, a phosphoric acid group, a sulfonic acid group, or an imidazole group.

4. The polymer electrolyte membrane of claim 1, wherein n is in the range of 1 to 3.

5. The polymer electrolyte membrane of claim 1, wherein n is 1.

6. The polymer electrolyte membrane of claim 1, wherein the cross-linking agent of Formula 1 is a chemical compound represented by Formula 2 or 3 below,

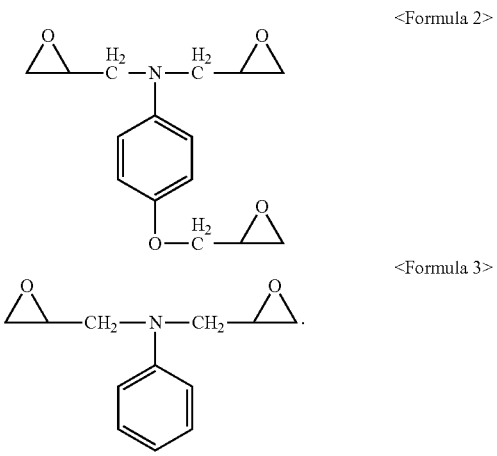

<Formula 2>

<Formula 3>

7. The polymer electrolyte membrane of claim 1, wherein the hydrophilic polymer is polybenzimidazole.

8. The polymer electrolyte membrane of claim 1, further comprising an acid.

9. The polymer electrolyte membrane of claim 8, wherein the acid includes at least one acid selected from the group consisting of sulfuric acid, phosphoric acid, methanesulfonic acid, and trifluoromethanesulfonic acid; and wherein the amount of the acid is in the range of 100 to 500 parts by weight based on 100 parts by weight of the hydrophilic polymer.

10. A fuel cell comprising the polymer electrolyte membrane of claim 1.

11. A method of preparing a polymer electrolyte membrane for fuel cell comprising:
preparing a composition for forming the polymer electrolyte membrane by mixing a hydrophilic polymer, a cross-linking agent represented by Formula 1 below and a solvent,
<Formula 1>

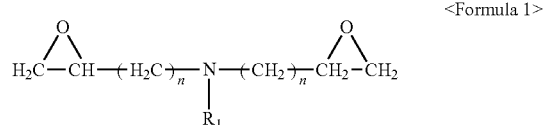

<Formula 1> wherein $R_1$ is a substituted or unsubstituted C1-C20 alkyl group, a substituted or unsubstituted C6-C20 aryl group, or a substituted or unsubstituted C2-C20 heteroaryl group; and n is an integer in the range of 1 to 5;
applying the composition for forming a polymer electrolyte membrane to a supporting substrate; and
heat treating the composition for forming the polymer electrolyte membrane to form the polymer electrolyte membrane, wherein the hydrophilic polymer comprises at least one material selected from the group consisting of poly (vinyl alcohol), poly (acrylamide), sulfonated polyaryletherketone, sulfonated polyphenyleneoxide, sulfonated polyether sulfone, sulfonated polyetherimide, polybenzimidazole, and polyimidazole, and the amount of the cross-linking agent is in the range of 0.01 to 0.5 mol based on 1 mol of the hydrophilic polymer repeating unit.

12. The method of claim 11, further comprising removing the polymer electrolyte membrane from the supporting substrate.

13. The method of claim 12, wherein the amount of the solvent is in the range of 100 to 2000 parts by weight based on 100 parts by weight of the hydrophilic polymer.

14. The method of claim 11, further comprising adding an acid to the composition for forming a polymer electrolyte membrane before applying the composition for forming a polymer electrolyte membrane to the supporting substrate or adding an acid to the formed polymer electrolyte membrane.

15. The method of claim 14, wherein the amount of the acid is in the range of 100 to 500 parts by weight based on 100 parts by weight of the hydrophilic polymer.

16. The method of claim 14, wherein the acid is at least one acid selected from the group consisting of sulfuric acid, phosphoric acid, methanesulfonic acid, and trifluoromethanesulfonic acid.

17. The method of claim 11, wherein the heat treating is performed at a temperature in the range of 60 to 130° C.

18. The method of claim 11, wherein the heat treating comprises:
performing a first heat treatment at a temperature in the range of 60 to 100° C; and
performing a second heat treatment at a temperature in the range of 100 to 130° C.

19. The method of claim 18, further comprising removing the composition for forming the polymer electrolyte membrane from the supporting substrate after the first heat treatment and before the second heat treatment.

20. The method of claim 11, wherein the solvent includes at least one solvent selected from the group consisting of dimethylacetamide, dimethylformamide, dimethylsulfoxide, and N-methyl-2-pyrrolidone.

* * * * *